3,354,109
HEAT-FUSIBLE COMPOSITION COMPRISED OF VINYL HALIDE RESIN, EPOXY RESIN AND ACID PLASTICIZER

Robert W. Evans, Hamburg, Mich., and William D. Todd, Bay Village, and Henry J. Essig, Westlake, Ohio, assignors to The B. F. Goodrich Company, New York, N.Y., a corporation of New York
No Drawing. Filed Nov. 19, 1963, Ser. No. 324,819
11 Claims. (Cl. 260—31.8)

This invention relates to modified vinyl halide polymers and copolymers and to the method for making same, which polymers are tough, flexible and resistant to solvents and oils. More particularly, the invention relates to vinyl halide polymer compositions comprising a uniform mixture of a polyvinyl halide resin, a polyepoxide and a plasticizer having a chemically bound acid group. As a specific embodiment, the invention provides unique, fluid, vinyl halide polymer plastisol and organosol compositions which are fused by heat to yield strong, flexible, chemically resistant coatings, films and sheets.

It is known to add plasticizing agents to a vinyl halide polymer to render the resin more flexible and resilient. Examples of the major commercial plasticizers are listed on page 184 of the September 1962 issue of the periodical "Modern Plastics." The conventional plasticizers possess the disadvantage of lowering the strength of the vinyl halide polymer, thus rendering the modified resin unsuitable for applications requiring a product which must be hard and tough as well as flexible.

It is known that some of the defects of the plasticized polyvinyl halide resin may be overcome by incorporating therein, as a hardening agent, an epoxy resin (also called epoxide resin, ethoxyline resin or polyepoxide). The epoxy resin is generally used in conjunction with a curing agent which will convert the polyepoxide into a hard, infusible, cross-linked polymer; the curing process is accelerated by heat, as for example, during the heat-fusing of the plastisol or organosol composition. Exemplary curing agents are primary diamines, polysulfides, anhydrides of dibasic acids, amino and phenolic resins and the like.

These known epoxy-modified plastisols have not proved to be altogether satisfactory. In many cases the fused, cured products are brittle; in other cases the fused product is a combination of materials having only limited compatibility and therefore poor physical strength and insufficient resistance to chemical attack. Stated differently, the conventional plasticizer and the epoxide resin are a somewhat heterogeneous and incoherent combination which does not impart the desired properties to the vinyl halide polymer.

It is, therefore, an object of this invention to provide vinyl halide polymer compositions which are not only hard and tough but also flexible and strong. It is a further object to provide a new type of plasticizer-hardener agent for vinyl halide polymers, which, after fusion of the mixture, desirably in the absence of adding curing agent, yields homogeneous resins having improved strength and resistance to extraction and degradation by oils and solvents. Other objects and advantages of the invention will be apparent from the description that follows.

It has been discovered that the objects of the present invention are accomplished by uniformly blending or intimately mixing with (a) 100 parts by weight of the polyvinyl halide resin in powder form (b) from about 30 to about 100 parts by weight of one or more plasticizers containing a chemically-bound carboxyl group and (c) from about 20 to about 90 parts by weight of a polyepoxide having a melting point less than about 50° C., preferably a liquid, low molecular weight glycidyl ether of a polyhydric phenol, and especially a diglycidyl ether of a dihydric phenol. The preferred mixtures are comprised of from about 40 to about 50 parts of the carboxylated plasticizer and from about 25 to about 35 parts of the epoxy resin per 100 parts of the vinyl halide polymer. The homogeneous, fluid, spreadable mixture can be used in spread coating, dipping, molding and extruding operations, where at the fusion temperature of the vinyl halide polymer and plasticizer, usually between about 145° and 205° C., a cured vinyl resin product having chemically bound epoxy resin segments incorporated therein is obtained.

The vinyl halide polymers embodied herein include the thermoplastic, resinous homopolymers of vinyl chloride, vinyl bromide, and vinyl fluoride. Also included within the scope of this invention and collectively referred to herein as "vinyl halide polymers or polyvinyl halide resins" are the resinous copolymers of one of the aforesaid vinyl halides with a monomer containing a single

group copolymerizable therewith, wherein the vinyl halide constituent units comprise at least 50% of the copolymer. Preferred monoolefinically unsaturated copolymerizable monomers include such compounds as vinylidene chloride, the vinyl ethers, the vinyl esters, especially vinyl acetate, and the like. The vinyl chloride homopolymers and copolymers are the most preferred resins embodied herein. The vinyl halide polymer that is modified according to this invention is employed in the small particle size form necessarily required in plastisol and organosol applications, for example, within the range of 0.1 to 10 microns on the average.

The epoxy resins embodied in the compositions of this invention have melting points which are less than about 50° C., although the preferred polyepoxide materials are liquid at room temperature, i.e. 20 to 35° C. The operable resins have an average molecular weight of at least about 300 and up to about 700. Best results are achieved when the average molecular weight is between about 300 and 450. These epoxide polymers are characterized by having an epoxy equivalency within the range of one to two, i.e., having one to two

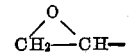

groups per molecule. The average number of epoxy groups contained in the average molecule is called the "epoxy equivalency," a value which is obtained by dividing the average molecular weight of the polyepoxide by the epoxide equivalent weight. The epoxide equivalent weight is determined by heating a weighed sample of the polyepoxide with an excess of pyridinium chloride dissolved in chloroform or pyridine to convert the epoxy groups to chlorohydrin groups by hydrochlorination. The excess pyridinium chloride is back-titrated with 0.1 N NaOH in methanol to the phenolphthalein end point. The epoxide equivalent weight is calculated by considering one HCl group equivalent to one epoxide group.

The preferred epoxy resins are the glycidyl polyethers of a dihydric phenol having a 1,2-epoxy equivalency of from one to two obtained by reacting in an alkaline medium a dihydric phenol with an excess of an epihalogenhydrin. Representative dihydric phenols are the polynuclear phenols such as 2,2-bis(4-hydroxyphenyl)propane, 2,2-bis(4-hydroxyphenyl)butane, 4,4'-dihydroxybenzophenone, bis(4-hydroxyphenyl)ethane, 1-5-dihydroxynaphthalene, 2,2 - bis(4 - hydroxy-2-methylphenyl) propane, 2,2 - bis(4 - hydroxy-2-tertiarybutylphenyl)propane, bis(2-hydroxynaphthyl)methane and the like and the mononuclear phenols such as resorcinol, catechol, hydroquinone and etc. The most preferred polyepoxide is the reaction product of 2,2-bis(4-hydroxyphenyl)propane, known commercially as Bisphenol-A, with epichlorohydrin.

Methods of synthesizing epoxy resins and their characteristics are described on pages 312–329 of "The Encyclopedia of Chemical Technology," First Supplement Volume, by Kirk and Othmer, The Interscience Encyclopedia Inc., New York, N.Y., 1957. A more detailed presentation is found in the book, "Epoxy Resins. Their Application and Technology," by Lee and Neville, McGraw-Hill Book Co., Inc., 1957, where, on pages 19–20, Tables 1–3, data are presented concerning some of the polyepoxides commercially available and suitable for use in this invention.

The novel plasticizer embodied in the composition of this invention is a liquid organic compound characterized by containing (1) at least one ester grouping known to impart plasticization to a polyvinyl halide resin and (2) at least one chemically-bound, reactive carboxyl (acid) group. Hence, the plasticizing compound is designated herein simply as an "acid plasticizer." In accordance with the invention, the plasticizing agent for the vinyl halide polymer-epoxy polymer blend may also be a mixture of two or more acid plasticizers, or of at least one acid plasticizer combined with one or more conventional plasticizing compounds. It is well known to employ mixtures of plasticizers to impart to the modified resin a range of diverse properties and utility. A comprehensive list of commercially available conventional plasticizers is found on pages 460–478 of the "Modern Plastics Encyclopedia Issue for 1963," vol. 40, No. 1A, September 1962.

Acid plasticizers embodied herein include the monoalkyl, mono-alkoxyalkyl and mono-alicyclic hydrocarbon esters of saturated and unsaturated aliphatic, alicyclic and aromatic dicarboxylic acids wherein the alkyl or alicyclic radical moiety of the ester function is a straight chain, branched chain or cyclic group having 2 to 18 carbon atoms such as ethyl, n-propyl, isopropyl, n-butyl, isobutyl, sec-butyl, t-butyl, cyclobutyl, n-amyl, isoamyl, t-amyl, n-hexyl, cyclohexyl, the heptyls, the octyls such as n-octyl, isooctyl, 2-ethyl hexyl and cyclooctyl, n-decyl, iso-decyl, lauryl, myristyl, cetyl, stearyl and the like radicals. Also useful herein as the acid plasticizers are the monobenzyl esters of the said dibasic acids.

Exemplary saturated acyclic dibasic acids from which acid plasticizers may be derived are adipic, pimelic, suberic, azelaic and sebacic, that is, those represented by the structure HOOC(CH$_2$)$_n$COOH where $n$ is an integer of 4 to 8. Other saturated aliphatic dibasic acids include succinic, glutaric, diethyl adipic, ethyl suberic and the like. Exemplary unsaturated aliphatic dibasic acids are maleic, fumaric, citraconic, mesaconic, itaconic, glutaconic and the like. The aromatic dicarboxylic acids include the benzenedicarboxylic acids (phthalic acids) such as phthalic (o-phthalic), isophthalic (m-phthalic) and terephthalic (p-phthalic) acid, naphthalic acid, α-phenyl glutaric acid, benzyl succinic acid, diphenic acid and the like. Also useful are the ring-monounsaturated dibasic acids which are obtained by hydrolysis of adducts of maleic anhydride with conjugated dienes. The saturated alicyclic dibasic acids include the cyclohexane dicarboxylic acids (obtained by the reduction of the phthalic acids), pinic acid and the like.

Mono-alkyl esters of dibasic acids containing other functional groups may be used as the acid plasticizer in accordance with this invention. Examples are diglycolic acid, thiodipropionic acid, butyryl-succinic acid, thiodiglycolic acid, trimethylindanedicarboxylic acid, and dicarboxylic acids derived from tetrahydrofuran.

In addition to the mono-esters of dibasic acids, other acid plasticizers embodied herein include the partially esterified tricarboxylic acids and higher polybasic acids. It is only required that the acid plasticizer contain at least one integral carboxyl group in conjunction with one or more conventional plasticizing groups.

The preferred acid plasticizers are represented by the structures

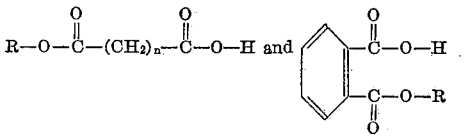

wherein $n$ is an integer of 4 to 8 and R is an alkyl group containing 2 to 18 carbon atoms. Particularly preferred are the acid plasticizers of the above formulae wherein R is an alkyl group having 4 to 10 carbon atoms, and $n$ is again 4 to 8.

The acid plasticizer is conveniently prepared by reacting the anhydride of a dibasic acid selected from among the classes above-described with an alcohol so selected to supply the desired alkyl, alicyclic or aromatic radical to the ester grouping of the mono-ester acid plasticizer. The reaction is advantageously promoted by applying heat thereto. A stoichiometric excess of the alcohol in the reaction mixture should be avoided to prevent undue esterification of the mono-ester's carboxyl group. A less preferred procedure for preparing the acid plasticizer is to effect an esterification reaction, using conventional esterification techniques, between the appropriate alcohol and a stoichiometric excess of the dibasic acid, the molar ratios of the reactants thus favoring the production of the acid plasticizer (mono-ester). It may then be expedient to separate the acid plasticizer from the unreacted acid and any diester by-product by employing one or more physical separation operations, such as filtration to remove solids in the product, crystallization followed by filtration, low pressure distillation and etc., the type of separation procedure best suited obviously being dependent on the physical characteristics of the compounds involved. If desired, the diester, a conventional plasticizer, need not be separated from the mono-ester since the plasticizer mixture may be used in the plastisol compositions of this invention as mentioned previously. The latter described method can also be used for the synthesis of acid plasticizers from higher polybasic acids, i.e., partial esterification of the acid with an alcohol followed by such purification of the products as might be deemed necessary.

The vinyl halide polymer-epoxy resin-acid plasticizer composition of this invention is obtained by homogeneously blending the said components at approximately 20 to 55° C., by means of well known mixing or blending apparatus such as a planetary mixer, a Banbury mixer, a sigma blade mixer and the like. The higher mixing temperatures are of course employed when working with a higher melting epoxy resin since a resin in the liquid state is more dispersible and forms more uniform mixtures with the other ingredients than a resin in granular form. When chosen within the ranges previously set forth, the relative proportions of the liquid epoxy resin and acid-plasticizer to the vinyl halide resin are such that the blend thereof has a liquid to paste-like consistency. The term "liquid" denotes a wide range of viscosity characteristics; in other words, a liquid composition may be highly fluid or just barely pourable. If the paste composition is thicker than desired, it may be thinned to the desired consistency by incorporating therein a conventional plasticizer or a volatile thinner as described below.

The above-described fluid compositions may be generally classed under the board connotation of "plastisols." They may be readily converted to the more fluid organosols having the desired application viscosity by blending an organic thinner therewith. The amount of the thinner, preferably a relatively volatile liquid, may range from about one to 30 parts by weight per 100 parts by weight of the vinyl resin. There are two classes of organosol thinning agents: dispersants and diluents. Dispersants are polar liquids with some solvating action with respect to the vinyl halide resin at ordinary temperatures, but which become active solvents at fusion and swelling temperatures. Exemplary dispersants are volatile ketones such as diisobutyl and methyl isobutyl ketone. Diluents are hydrocarbon thinners which have no solvating action on the resin and include paraffinic, cycloparaffinic, terpene and aromatic hydrocarbons, for example, naphtha, hexane and xylene. In general, the boiling points of thinners used for organosols are in the range from about 100 to 200° C.

It is desirable to include in the compositions of this invention small amounts, e.g., 1 to 5 parts per 100 parts by weight of the vinyl halide polymer, of the conventional additive compounds useful as heat and light stabilizers. Examples of such stabilizers well known in the art of vinyl plastics are the barium, cadmium, zinc, tin and lead salts of monocarboxylic acids and mixtures thereof, and the alkyl derivatives of tin such as the dialkyl tin mercaptides and thiazoles.

The plastisols and organosols of this invention are especially suited for the production of coatings, laminated materials, and castings. They may be applied to substrate materials or converted into self-sustaining objects having no substrate support by such well known operations as spread-coating, dipping, extruding and molding. During the forming operation, the composition is heated to a temperature in the range of about 145° to 205° C., preferably about 175° to 205° C., thereby gelling and then fusing the plasticizer with the vinyl halide polymer and causing a cure of the epoxy resin while it is simultaneously being chemically linked with the acid plasticizer. The result is the formation of a homogeneous, strong, hard, tough, clear, resinous material. Generally, the curing reaction is completed in about five to ten minutes at the said elevated temperatures.

The examples that follow are presented to illustrate and clarify the invention and should not be interpreted so as to limit the ambit of the invention as defined by the appended claims, since variations and modifications of the invention will be obvious to those skilled in the art and can be made without departing from the spirit and scope thereof. In the examples, the amounts of ingredients are given in parts by weight unless otherwise indicated.

The initial experiments described below illustrate the preferred method for preparing an acid plasticizer. The rest of the examples deal with the preparation of plasticized polyvinyl halide-epoxide resin compositions. The liquid or paste plastisol compositions were generally made by preparing a uniform mixture of the components (vinyl halide polymer, epoxy resin and plasticizer) in a "Hobart" mixer. The ingredients were mixed for about 30 minutes at about 25° C. The mixture was then held dormant for 30 minutes for purposes of deaeration. Next, films having a thickness of 20 mils were cast therefrom on ferrotype plates using a "Bird" film casting bar applicator. The films were the fused and cured in an air circulating oven at several different temperatures and for different periods of time. Physical properties data on the resins were obtained by testing the resin specimens according to the following procedures.

MECHANICAL PROPERTIES

Ultimate tensile strength in lbs./sq. inch, percentage elongation at break and 100% modulus in lbs./sq. inch, using an "Instron" tensile test machine _____ ASTM method D638.
Indentation hardness by means of a durometer __ ASTM method D1706–59T.
Tear resistance, in lbs./inch using Instron machine, die C _____ ASTM method D1004.

PERMANANENCE PROPERTIES

*Gasoline extraction test.*—Weighed film samples 1 inch x 2 inches and 20 mils thick were immersed in gasoline at room temperature for 24 hours. They were then wiped dry and reweighed to determined the "percent absorbed," based on the original specimen weight (gasoline absorbed by the resin composition). The films were then placed in an air oven at 50° C. for four hours to volatilize the absorbed gasoline, and cooled and weighed to determine the "percent extracted" (material extracted from the resin composition by the gasoline).

*Crisco extraction test.*—Film samples 1 inch x 2 inches and 20 mils thick were immersed for 18 hours at 250° F. in "Crisco" (hydrogenated vegetable oils, a product of Procter and Gamble Co.). They were cooled, wiped dry and weighed. The percentage volume change was recorded.

*Soapy water extraction test.*—Films 1 inch x 2 inches and 20 mils thick were immersed in a 1% solution of white soap flakes in distilled water for 24 hours at 70° C. They were wiped dry and weighed to determine the "percent absorbed," then dried at 50° C. for four hours, cooled and weighed to determine the "percent extracted," based on the original weight of the specimen.

*Residual acid content.*—1 inch x 1 inch x 20 mils films were tumbled in tetrahydrofuran solvent for 72 hours at 65° C. The solutions were titrated with NaOH in methyl alcohol solution to determine the acid content of the resin.

PREPARATION OF ACID-PLASTICIZERS

The procedures described below briefly illustrate one method for preparing acid plasticizers suitable for the compositions of the invention.

A. Mono-octyl acid phthalate, represented by the formula

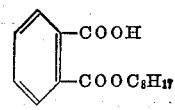

was synthesized by reacting equimolar quantities of phthalic anhydride and n-octyl alcohol. The reactants were stirred for 16 hours at 57 to 68° C. for a period of 16 hours. Unreacted phthalic anhydride was noted in the amber liquid product. A filter aid was added to the mixture and the anhydride was separated therefrom by filtration. Unreacted octanol was removed from the monooctyl acid phthalate by distilling off the relatively volatile alcohol at 92° C. and 3 mm. of Hg absolute pressure. The yield of mono-octyl acid phthalate was 73.2% of the theoretical recovery and analysis thereof indicated an acid content of 94.7% of the theoretical amount.

B. Mono-2-ethyl hexyl acid phthalate was prepared by reacting equimolar quantities of phthalic anhydride and 2-ethyl hexyl alcohol at 60° C. for 24 hours. The product, a clear liquid, was recovered in almost 100% yield, thereby eliminating the need for any subsequent purification steps. It contained 98.2% of theoretical acid groups. The high yield in this experiment is attributed to the extreme purity of the raw materials; the alcohol had been heated to boiling to remove low boiling contaminants and the phthalic anhydride had not been previously exposed to air.

Example I

In this series of experiments, four plastisol compositions were prepared for evaluation. They consisted of blends of (a) a pulverulent vinyl chloride polymer composed of particles ranging in size of from about 0.1 to 10 microns ("Geon 121," a general purpose resin which is the product of The B. F. Goodrich Chemical Co.); (b) a liquid, difunctional epoxy resin having an average molecular weight of 350 to 400, an epoxide equivalent weight of 175 to 210, and a viscosity (Gardner-Holdt) of 5,000 to 15,000 centipoises at 25° C. ("Epon 828," a product of the Shell Chemical Company, formed by reacting Bisphenol-A with epichlorohydrin); and (c) a plasticizer, in two cases an acid plasticizer, specifically, mono-octyl acid phthalate. To two compositions, one containing an acid plasticizer and the other a conventional di-ester plasticizer, were added pyromellitic dianhydride (PMDA) which is a commonly-used epoxy resin curing agent for promoting hardening. The specific amounts of ingredients used in formulating the plastisols of this example are shown in Table 1. Films were cast from the plastisols and fused for 5 to 10 minutes at 350 and 400° F., thereby also curing the epoxy polymer constituent. Physical properties of the fused resins are found in Table 2. The symbol (—) in the table indicates that particular determination was not made.

The results and comparisons show that the resin produced in accordance with this invention (Sample A) has the best balance of mechanical properties, including good tensile strength, tear resistance, hardness and flexibility. Its films were also transparent. The addition of the PMDA curing agent to this composition (Sample C) resulated in an opaque and brittle product having negligible to no elongation. Sample A exhibited much greater resistance to extraction in hot "Crisco" than Sample B; the conventionally-plasticized resin, and its resistance to the oil was comparable to that of Sample D, the resin containing the PMDA curing agent as well as the acid plasticizer.

TABLE 1.—FORMULATION OF PLASTISOL COMPOSITIONS, IN PARTS

| Sample Number | A | B | C | D |
|---|---|---|---|---|
| Polyvinyl Chloride (Geon 121) | 100 | 100 | 100 | 100 |
| Mono-octyl acid phthalate | 40 | ---- | 40 | ---- |
| Dioctyl phthalate | ---- | 40 | ---- | 40 |
| Epoxy resin (Epon 828) | 30 | 30 | 30 | 30 |
| Pyromellitic dianhydride | ---- | ---- | 20 | 20 |

TABLE 2.—PHYSICAL PROPERTIES OF FUSED RESINS OF EXAMPLE I

| Sample | Cure period, minutes | Cure Temp., °F. | Instron Tester at 0.2 inch/min. | | | | Instron Tester at 20 in./min. | | |
|---|---|---|---|---|---|---|---|---|---|
| | | | Tensile | Elong. | 100% Mod. | Tear | Tensile | Elong. | Tear |
| A | 5 | 350 | 3,400 | 280 | 1,620 | 380 | 2,805 | 265 | 482 |
| A | 10 | 350 | 3,630 | 270 | 2,190 | 443 | 2,878 | 220 | 664 |
| A | 5 | 400 | 3,760 | 280 | 1,970 | 555 | 3,065 | 275 | 740 |
| A | 10 | 400 | 3,850 | 240 | 2,430 | 677 | 2,975 | — | 680 |
| B | 5 | 350 | 2,980 | 375 | 715 | 215 | 2,780 | 370 | 258 |
| B | 10 | 350 | 2,380 | 320 | 685 | 218 | 2,905 | 360 | 265 |
| B | 5 | 400 | 2,500 | 340 | 790 | 249 | 2,440 | 360 | 293 |
| B | 10 | 400 | 2,350 | 290 | 900 | 260 | 2,750 | 320 | 315 |
| C | 5 | 350 | 2,800 | 10 | — | — | 658 | — | — |
| C | 10 | 350 | 3,200 | 5 | — | — | 571 | — | — |
| C | 5 | 400 | 3,400 | 5 | — | — | 861 | — | — |
| C | 10 | 400 | 3,200 | 0 | — | — | 682 | — | — |
| D | 5 | 350 | 2,030 | 210 | 1,820 | 310 | 2,493 | 320 | 500 |
| D | 10 | 350 | 2,500 | 250 | 2,000 | 328 | 2,490 | 175 | 518 |
| D | 5 | 400 | 2,230 | 200 | 2,060 | 312 | 2,553 | 110 | 548 |
| D | 10 | 400 | 2,450 | 120 | 2,450 | 255 | 2,956 | 10 | — |

| Sample | Hardness of resin cured for 30 minutes at 350° F., Shore D | Characteristics of film cured for 10 minutes at 400° F. | "Crisco" test (24 hour immersion at 250° F.)—percent volume change of film cured for 5 minutes at— | |
|---|---|---|---|---|
| | | | 350° F. | 400° F. |
| A | 72 | Clear and flexible | −11.2 | −9.1 |
| B | 31 | ----do---- | −38.5 | −35.9 |
| C | 84 | Opaque and brittle | −6.0 | −7.4 |
| D | 67 | Clear and flexible | −10.4 | −11.8 |

Key: Tensile=ultimate tensile strength; Elong.=elongation at break; Mod.=modulus; Tear=tear resistance.

Example II

In this series of experiments, four plastisols composed of 100 parts of polyvinyl chloride (Geon 121) and variable amounts of mono-octyl phthalate acid plasticizer and epoxy (Epon 828) were prepared along with a "control" plastisol containing dioctyl phthalate plasticizer instead of the acid type. The apparent viscosities of the plastisols were measured by a Brookfield Model RVF Viscometer according to ASTM method D1824–61T. Films cast from the plastisols were fused for 10 minutes at 350° and 400° F. Details on the formulation recipes and physical test data are presented in Table 3.

The control resin (Sample J) was considerably softer and weaker than the compositions of the invention (Samples E through H). Gasoline extraction tests on the cured plastic films showed that the control specimen was comparatively non-resistant to the hydrocarbon solvent, a relatively large amount of plasticizer being extracted thereby.

TABLE 3.—FORMULATION OF PLASTISOL COMPOSITIONS IN PARTS

| Sample Number | E | F | G | H | J |
|---|---|---|---|---|---|
| Polyvinyl chloride (Geon 121) | 100 | 100 | 100 | 100 | 100 |
| Mono-octyl acid phthalate | 40 | 45 | 50 | 55 | |
| Dioctyl phthalate | | | | | 45 |
| Epoxy resin (Epon 828) | 35 | 30 | 25 | 20 | 30 |
| Brookfield viscosity at 2 r.p.m. after one hour aging, poises | 280 | 260 | 140 | 130 | 55 |
| Physical Properties of Fused, Cured Resins: | | | | | |
| Hardness after 30 minute cure at 350° F., Shore D | 77 | 75 | 68 | 66 | 28 |
| Instron Tester, at 20 inches/minute: | | | | | |
| Film cured 10 min. at 350° F.: | | | | | |
| Tensile | 3,750 | 3,525 | 3,000 | 2,950 | 3,230 |
| Elongation | 200 | 175 | 160 | 290 | 400 |
| 100% Modulus | 2,725 | 2,475 | 2,475 | 2,300 | 1,300 |
| Tear resistance | 725 | 725 | 625 | 640 | 250 |
| Film cured 10 minutes at 400° F.: | | | | | |
| Tensile | 4,250 | 4,000 | 4,125 | 4,325 | 3,200 |
| Elongation | | | | 250 | 370 |
| 100% Modulus | | | | 2,850 | 1,225 |
| Tear resistance | 760 | 725 | 675 | 700 | 300 |
| Gasoline extraction test, percent weight change on— | | | | | |
| Film cured 10 min. at 350° F.: | | | | | |
| Percent absorbed | +25.4 | +18.0 | +18.2 | +17.3 | −14.4 |
| Percent extracted | −3.8 | +1.0 | −1.6 | −3.7 | −25.4 |
| Film cured 10 min. at 400° F.: | | | | | |
| Percent absorbed | +22.5 | +21.7 | +12.7 | +23.0 | −14.4 |
| Percent extracted | +3.5 | +4.1 | | −4.5 | −25.5 |

*Example III*

In this series of experiments, the formulations were the same as in Example II except that the acid plasticizer was the mono-2-ethyl hexyl ester of phthalic acid. Sample J, described in Example II and containing dioctyl phthalate plasticizer, is included herein for purposes of comparison. The data are presented in Table 4.

The observations and conclusions regarding the properties of the compositions of the invention embodied in this example are essentially the same as those noted in the previous example; however, these resins were slightly weaker than the mono-n-octyl acid phthalate plasticized resins. The novel resins embodied herein were considerably more resistant to plasticizer extraction by soap than the conventionally plasticized control resin.

*Example IV*

A series of plastisols were prepared by mixing together a pulverulent vinyl chloride polymer, an acid plasticizer, and dipentene dioxide, which is a lower molecular weight, difunctional, liquid epoxy resin, the diglycidyl derivative of D-limonene with a molecular weight of 169. ("Unox 269," a product of Union Carbide Chemicals Company). The data are summarized in Table 5. The cured resinous films were optically clear, indicating good compatibility of the components, however, they were somewhat physically weaker than the compositions containing the Bisphenol-A/epichlorohydrin type resin and showed inadequate resistance to gasoline extraction.

TABLE 4.—FORMULATION OF PLASTISOL COMPOSITIONS IN PARTS

| Sample Number | J | K | L | M | N |
|---|---|---|---|---|---|
| Polyvinyl chloride (Geon 121) | 100 | 100 | 100 | 100 | 100 |
| Mono-2-ethylhexyl acid phthalate | | 45 | 40 | 50 | 55 |
| Dioctyl phthalate | 45 | | | | |
| Epoxy resin (Epon 828) | 30 | 30 | 35 | 25 | 20 |
| Brookfield viscosity at 2 r.p.m. after one hour aging, poises | 55 | 520 | 540 | 380 | 260 |
| Properties of Fused, Cured Resins: | | | | | |
| Residual Acid Content, Percent | | 26.5 | 11.9 | 31.9 | 39.9 |
| Hardness after 30 minute cure at 350° F., Shore D | 28 | 73 | 74 | 70 | 65 |
| Instron Tester, at 20 inches/minute: | | | | | |
| Film cured 10 min. at 350° F.: | | | | | |
| Tensile | 3,230 | 3,000 | 2,880 | 2,900 | 3,030 |
| Elongation | 400 | 290 | 270 | 285 | 285 |
| 100% Modulus | 1,300 | 2,400 | 2,450 | 2,400 | 2,300 |
| Tear resistance | 250 | 625 | 675 | 600 | 525 |
| Film cured 10 minutes at 400° F.: | | | | | |
| Tensile | 3,200 | 3,500 | 3,430 | 3,550 | 3,100 |
| Elongation | 370 | 220 | | 210 | 200 |
| 100% Modulus | 1,225 | 2,450 | | 2,700 | 2,450 |
| Tear resistance | 300 | 775 | 625 | 800 | 725 |
| Gasoline extraction test, percent weight change on— | | | | | |
| Film cured 10 min. at 350° F.: | | | | | |
| Percent absorbed | −14.4 | +13.9 | +12.2 | +14.9 | +13.1 |
| Percent extracted | −25.4 | +2.0 | +2.4 | +1.8 | +2.5 |
| Film cured 10 min. at 400° F.: | | | | | |
| Percent absorbed | −14.4 | +8.9 | +6.0 | +10.2 | +12.0 |
| Percent extracted | −25.5 | +4.1 | +3.5 | +4.4 | +3.3 |
| Soapy water extraction test, percent weight change on— | | | | | |
| Film cured 10 min. at 350° F.: | | | | | |
| Percent absorbed | −1.1 | −1.5 | −1.5 | −1.7 | −1.2 |
| Percent extracted | −4.8 | −1.1 | −1.2 | −3.6 | −3.3 |
| Film cured 10 min. at 400° F.: | | | | | |
| Percent absorbed | −0.7 | −2.5 | −2.4 | −2.5 | −2.6 |
| Percent extracted | −5.9 | −0.4 | −0.2 | −0.9 | −1.0 |

TABLE 5.—FORMULATION OF PLASTISOL COMPOSITION PARTS

| Sample Number | O | P | Q |
|---|---|---|---|
| Polyvinyl chloride (Geon 121) | 100 | 100 | 100 |
| Mono-octyl acid phthalate | 66 | 66 | 66 |
| Epoxy resin (Unox 269) | 20 | 30 | 40 |
| Physical Properties of Fused Resin, cured 5 min. at 350° F.: | | | |
| Instron Tester, at 20 inches/minute: | | | |
| Tensile | 2,700 | 2,700 | 2,500 |
| Elongation | 340 | 375 | 385 |
| 100% Modulus | 1,550 | 1,425 | 1,275 |
| Tear resistance | 345 | 350 | 300 |
| Gasoline extraction test, weight change: | | | |
| Percent absorbed | −8.6 | −8.9 | −10.6 |
| Percent extracted | −21.0 | −21.9 | −23.9 |

*Example V*

An alternate method for preparing the compositions embodied herein was investigated and proved to be inadequate. An adduct of mono-n-octyl acid phthalate and a liquid epoxy resin (Epon 828) was produced by reacting the said ingredients at 100 to 150° C. for 13.5 hours. The plasticizer-polyepoxide adduct was a viscous liquid. It was blended with powdered vinyl chloride polymer by admixing on a laboratory roll mill at 250° F. for 10 minutes. The mill was cooled to room temperature and the stock was formed into sheets 0.04 inch thick. These were cut into samples 6 inch square which were pressed between cellophane for 5 minutes and 10 minutes at 350° F. into films having a thickness of 20 mils.

The formulation weights and physical properties data are given in Table 6. The films were "cheesy," weak, tan colored, had poor clarity and bled excessively, all of which indicated incompatibility. Resistance to extraction by gasoline was unsatisfactory.

TABLE 6.—FORMULATION OF PLASTISOL

Sample Number R:
  Polyvinyl chloride (Geon 121) _____ 100
  Acid plasticizer/epoxy resin adducts, product of—
    Mono-octyl acid phthalate _____ 42.5
    and
    Epon 828 _____ 32.5

PHYSICAL PROPERTIES OF FUSED RESIN

Instron Tester, at 20 inches/minute:
  Film cured 5 min. at 350° F.:
    Tensile _____ 400
    Elongation _____ 0
    Tear resistance _____ 43
  Film cured 10 min. at 400° F.:
    Tensile _____ 190
    Elongation _____ 0
    Tear resistance _____ 22
Gasoline extraction test, percent weight change on—
  Film cured 5 min. at 350° F.:
    Percent absorbed _____ −1.9
    Percent extracted _____ −15.1
  Film cured 10 min. at 400° F.:
    Percent absorbed _____ −1.0
    Percent extracted _____ −15.0

We claim:
1. A vinyl halide resin fluid composition capable of being cured to form a hard, flexible product comprising (a) 100 parts by weight of a vinyl halide resin in powder form, said vinyl halide resin being selected from the group consisting of homopolymers of vinyl halides and copolymers of vinyl halides and other monoethylenically unsaturated monomers copolymerizable therewith in which the vinyl halide is in a major proportion, (b) from about 30 to about 100 parts by weight of an acid plasticizer, said acid plasticizer being a liquid mono ester of a dibasic acid said ester grouping known to impart plasticization to the polyvinyl halide resin and at least one carboxyl group, and (c) from about 20 to about 90 parts by weight of a polyepoxide having a melting point less than about 50° C., an average molecular weight within the range of about 300 to about 700 and an epoxy equivalency within the range of 1 to 2 said polyepoxide being a glycidyl polyether of a dihydric phenol.

2. A hard, flexible product obtained by curing the composition of claim 1 at a temperature between about 145° C. and 205° C.

3. A vinyl chloride resin fluid composition capable of being cured to form a hard flexible product comprising (a) 100 parts by weight of homopolymers of vinyl chloride or copolymers of vinyl chloride with at least one other monoethylenically unsaturated monomer copolymerizable therewith and in which the vinyl chloride is in a major proportion, said resin in powder form, (b) from about 30 to about 100 parts by weight of an acid plasticizer, said acid plasticizer being a liquid organic compound of a dibasic acid containing at least one ester grouping known to impart plasticization to the polyvinyl chloride resin and at least one carboxyl group, and (c) from about 20 to about 90 parts by weight of a polyepoxide having a melting point less than about 50° C., an average molecular weight within the range of about 300 to about 700 and an epoxy equivalency within the range of 1 to 2, said polyepoxide being a glycidyl polyether of a dihydric phenol.

4. The composition according to claim 3 wherein the acid plasticizer is a mono-alkyl ester of an acylic dibasic acid, having the formula

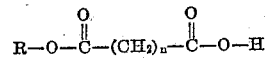

wherein $n$ is an integer of 4 to 8 and R is an alkyl group containing 2 to 18 carbon atoms.

5. The composition according to claim 4 wherein the polyepoxide has an average molecular weight within the range of about 300 to about 450 and is the reaction product of 2,2-bis(hydroxyphenyl)propane and epichlorohydrin.

6. The composition according to claim 3 wherein the acid plasticizer is a mono-alkyl ester of phthalic acid, having the formula

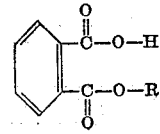

wherein R is an alkyl group containing 2 to 18 carbon atoms.

7. The composition according to claim 6 wherein the polyepoxide has an average molecular weight within the range of about 300 to about 450 and is the reaction product of 2,2-bis(hydroxyphenyl)propane and epichlorohydrin.

8. A vinyl halide resin fluid composition capable of being cured to form a hard, flexible product comprising (a) 100 parts by weight of homopolymers of vinyl chloride or copolymers of vinyl chloride with at least one other monoethylenically unsaturated monomer copolymerizable therewith and in which the vinyl chloride is in a major proportion, said resin in powder form, (b) from about 40 to about 50 parts by weight of mono-octyl acid phthalate, and (c) from about 25 to about 35 parts by weight of a polyepoxide having a melting point less than about 50° C., an average molecular weight within the range of about 300 to about 450 and an epoxy equivalency within the range of 1 to 2 and being a glycidyl polyether of a dihydric alcohol.

9. The composition according to claim 8 wherein the polyepoxide is the reaction product of 2,2-bis(hydroxyphenyl)propane and epichlorohydrin.

10. A hard, flexible product obtained by curing the composition of claim 9 at a temperature within the range of about 175° C. to 205° C.

11. The hard flexible product obtained by curing the composition of claim 3 at a temperature between about 145° C. and 205° C.

References Cited

UNITED STATES PATENTS

| | | | |
|---|---|---|---|
| 2,015,088 | 9/1935 | Reid | 260—31.8 |
| 2,537,712 | 1/1951 | Serdynsky et al. | 260—31.8 |
| 2,795,565 | 6/1957 | Newey | 260—836 |
| 2,965,586 | 12/1960 | Fisch | 260—836 |

JULIUS FROME, *Primary Examiner.*

L. T. JACOBS, *Assistant Examiner.*